United States Patent [19]

Sando et al.

[11] Patent Number: 5,180,497

[45] Date of Patent: Jan. 19, 1993

[54] METHOD FOR DECOLORIZATION OF WASTE WATER

[75] Inventors: Yoshiteru Sando; Eiichi Nakano; Hiroshi Ishidoshiro, all of Wakayama, Japan

[73] Assignee: Sando Iron Works Co., Ltd., Wakayama, Japan

[21] Appl. No.: 757,893

[22] Filed: Sep. 11, 1991

[30] Foreign Application Priority Data

Nov. 22, 1990 [JP] Japan .................................. 2-320137

[51] Int. Cl.$^5$ .............................................. C02F 1/56
[52] U.S. Cl. .................................... 210/665; 210/727; 210/917
[58] Field of Search .............................. 210/723–728, 210/737, 917, 665, 666

[56] References Cited

U.S. PATENT DOCUMENTS

| | | | |
|---|---|---|---|
| 3,170,869 | 2/1965 | Imoto | 210/732 |
| 3,761,406 | 9/1973 | Tsuk | 210/928 |
| 5,026,485 | 6/1991 | Anderson | 210/726 |

FOREIGN PATENT DOCUMENTS 54-100142  7/1979  Japan .................................. 210/917

Primary Examiner—Peter Hruskoci
Attorney, Agent, or Firm—McAulay Fisher Nissen Goldberg & Kiel

[57] ABSTRACT

A method for the decolorization of waste water containing coloring matters comprising dyestuff and/or pigment, in which PVA is added to a waste water containing coloring matters as above mentioned so as to catch the coloring matters in the waste water into the PVA, a precipitant of the coloring matters is added to the resultant waste water so as to render the coloring matters absorbed onto the PVA insoluble, a coagulant of PVA is added to the waste water so as to make the PVA insoluble, and then the thus insolubilized PVA containing the coloring matters is separated for the recovery thereof, and thus the decolorization of a waste water containing the coloring matters can be done skillfully and economically by eliminating the drawbacks in the conventional arts.

1 Claim, No Drawings

METHOD FOR DECOLORIZATION OF WASTE WATER

BACKGROUND OF THE INVENTION

1. Field of the Invention

The present invention relates to a method for the decolorization of colored waste water containing dyestuff and/or pigment disposed from a dyeing factory of a textile product.

2. Description of the Prior Art

For instance, in the dyeing factory of a textile product comprising a material such as cloth industrially, a large quantity of waste water containing dyestuff and/or pigment is exhausted. When such a waste water is disposed as it stands into a river, the river is polluted, and there occurs the problem of public pollution. Therefore, the waste water exhausted from the dyeing factory of a textile product has conventionally been subjected to a decolorization treatment prior to the discharge into a river. In the prior arts for the decolorization treatment of such coloring matters, there have been known the following processes: (a) by the coagulation with the addition of a suitable metal hydroxide such as of iron and aluminum, (b) by the adsorption with the use of an adsorbent such as ion exchange resin, active carbon, silica gel and alumina, (c) by the oxidation-decomposition with the use of an oxidant such as chlorine, ozone and hydrogen peroxide and (d) by the neutralization-coagulation with the addition of a polyelectrolyte having an opposite charge.

However, there are various difficulties in the above-mentioned conventional decolorization treatment methods. Namely, a large quantity of sludge is formed in the method (a), the decolorization is difficult when the waste water contains a large quantity of coloring matters in the method (b), a large quantity of decolorization chemical and a long treating time (2-3 days) are needed in the method (c) and further, in the method (d), since the waste water to be decolorized contains usually various kinds of coloring matter, complete decolorization is difficult.

Summary of the Invention

Under such circumstances, the object of the present invention is to offer an improved method for the decolorization treatment of waste water containing coloring matters disposed from the dyeing factory of a textile product by eliminating the drawbacks as above mentioned in the conventional arts.

The essential points of the present inventive method is to add polyvinyl alcohol to the waste water colored with dyestuff and/or pigment so as to catch the coloring matters therein, and after said coloring matters caught by polyvinyl alcohol is made insoluble by the addition of a suitable chemical, said polyvinyl alcohol is made insoluble by the addition of a suitable coagulant for polyvinyl alcohol, and finally the thus precipitated polyvinyl alcohol containing coloring matters is recovered by separation so as to subject the waste water to the decolorization treatment effectively and economically.

Detailed Description of the Preferred Embodiments

To describe the embodiments of the present invention more in detail, polyvinyl alcohol (hereinafter will simply be described as PVA) is added in the first place to the waste water containing dyestuff and/or pigment exhausted from the continuous dyeing process of a textile product in an amount of 0.2-0.5 % under stirring. With the adding of PVA, the dyestuff at pigment act in the waste water are adsorbed onto PVA. Then, a chemical for making the coloring matters insoluble in water (as will be stated hereinafter) is added to thus treated waste water for preventing the falling off (dissolution) of the coloring matters adsorbed onto PVA. In the next place, a coagulant of PVA itself such as ammonium persulfate or a borate is added to the resultant waste water for coagulating PVA in said water. The waste water containing coagulated PVA is then subjected to filtration for the recovery of PVA. Thus, it is possible to make the thus treated waste water colorless and transparent.

As the PVA for the adsorption of coloring matters in the above, while it is of course that fresh PVA can be used, an aqueous solution containing PVA exhausted in the desizing process of a textile product can also be utilized. By using such a waste water, the utility of the present invention can further be elevated.

In the present invention, in this way, PVA is added to a waste water containing coloring matters so as to adsorb the coloring matters therein. After the thus adsorbed coloring matters are made into insoluble in water, the resultant PVA containing the coloring matters is coagulated for the separation and recovery thereof from the waste water. Therefore, the treatment of waste water containing coloring matters can be performed with a high efficiency due to the effect of PVA for the adsorption of the coloring matters. Moreover, since the PVA in which the coloring matters are adsorbed in this way can effectively be coagulated due to the effect of the coagulant thereof, the separation and recovery of PVA can be done effectively, and thus the formation of sludge in the waste water, of which formation was enormous in the conventional arts, can perfectly be avoided.

Further, in the present invention, since PVA is used as a medium for adsorbing coloring matters on the one hand, and easily available ammonium persulfate or a borate is used as a coagulant of PVA on the other hand, it is possible that the decolorization treatment of a waste water containing coloring matters can economically be done.

Now experimental examples of the present inventive method will be described in the following.

EXAMPLE 1

To 3 parts of a waste water containing coloring matters, which was obtained by mixing nearly equal amounts of a residual waste water in the printing of a cloth and the waste water in the washing of said printed cloth, 1 part of the waste water containing 1% of PVA in the desizing process thereof were mixed so as to adsorb the coloring matters contained in the resultant waste water onto PVA. Then, 0.1% of a precipitant of the coloring matters with the commercial name of Sun Fix P.A.C. 700 conc. (made by Sanyo Kasei Kogyo & Co.) was added together with a coagulant of PVA comprising a mixture of 0.4% of ammonium persulfate and 1% of 50° Be $H_2SO_4$ to the thus treated waste water. Finally, the thus treated mixed waste water was subjected to the heat treatment at a temperature of about 90° C. for about 10 minutes. In this way, the PVA, in which the coloring matters were adsorbed in solid state, was separated from the residual water by coagulation, and thus the coloring matters in the waste water could completely be removed therefrom to give colorless waste water satisfactorily.

EXAMPLE 2

4 parts of a waste water containing coloring matters, which was obtained by mixing nearly equal amounts of a residual waste water in the printing of a cloth and a washing water of said printed cloth, and 1 part of the waste water containing 1.3% of PVA in the desizing process thereof were mixed so as to adsorb the coloring matters in the resultant waste water onto PVA. Then a precipitant of the coloring matters comprising a mixture of 0.1% of Sun Floc 700 (made by Sanyo Kasei Kogyo & Co.) and 0.15% of sodium hydroxide was added to the resultant waste water, and the mixture was heated to a temperature of about 70° C. so as to render the coloring matters adsorbed onto PVA insoluble. After 5 minutes, 1% of a coagulant of PVA named PA 10535 (made by Okahata Sangyo & Co.) was added thereto, and by heating the waste water thus treated for about 10 minutes at a temperature of about 90° C. so as to coagulate and separate the PVA containing said insolubilized coloring matters. In this way, the waste water thus treated was decolorized perfectly after filtration.

What is claimed is:

1. A method for the decolorization of waste water which contains colored matter selected from the group consisting of dyestuffs, pigments, and combinations thereof, comprising:
    a) admixing polyvinylalcohol with the waste water to absorb the colored matter;
    b) admixing a precipitant to the mixture from step a) to insolubilize the colored matter;
    c) admixing a coagulant selected from the group consisting of ammonium persulfate and borate to insolubilize the polyvinylalcohol; and
    d) separating the insolubilized polyvinyl alcohol and colored matter absorbed therein from the waste water.

* * * * *